(12) United States Patent
Han et al.

(10) Patent No.: US 10,979,740 B2
(45) Date of Patent: *Apr. 13, 2021

(54) ADAPTIVE FIELD OF VIEW PREDICTION

(71) Applicant: AT&T Intellectual Property I, L.P., Atlanta, GA (US)

(72) Inventors: Bo Han, Bridgewater, NJ (US); Vijay Gopalakrishnan, Edison, NJ (US); Tan Xu, Bridgewater, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/859,937

(22) Filed: Apr. 27, 2020

(65) Prior Publication Data

US 2020/0260126 A1 Aug. 13, 2020

Related U.S. Application Data

(63) Continuation of application No. 16/184,937, filed on Nov. 8, 2018, now Pat. No. 10,638,165.

(51) Int. Cl.
*H04N 21/218* (2011.01)
*G06F 3/01* (2006.01)
*G06F 3/0481* (2013.01)
*H04N 19/597* (2014.01)
(Continued)

(52) U.S. Cl.
CPC ....... *H04N 21/21805* (2013.01); *G06F 3/012* (2013.01); *G06F 3/04815* (2013.01); *G06N 20/20* (2019.01); *H04N 19/17* (2014.11); *H04N 19/597* (2014.11)

(58) Field of Classification Search
CPC .............................. H04N 21/21805
See application file for complete search history.

(56) References Cited

U.S. PATENT DOCUMENTS

| 4,692,806 A | * | 9/1987 | Anderson | G06T 3/403 |
| | | | | 375/240.08 |
| 4,853,780 A | * | 8/1989 | Kojima | H04N 19/503 |
| | | | | 375/240.14 |

(Continued)

OTHER PUBLICATIONS

Sun, Liyang, et al. "Multi-path multi-tier 360-degree video streaming in 5G networks." Proceedings of the 9th ACM Multimedia Systems Conference. ACM, 2018.

*Primary Examiner* — Pankaj Kumar
*Assistant Examiner* — Timothy R Newlin

(57) ABSTRACT

A method for streaming a 360 degree video over a communications network, wherein the video is streamed in a plurality of chunks, includes selecting a prediction window during which to predict a field of view within the video, the field of view is expected to be visible by a viewer at a time of playback of a next chunk of the video, wherein a duration of the prediction window is based on at least one condition within the communications network, selecting a machine learning algorithm to predict the field of view based on a head movement of the viewer, wherein the machine learning algorithm is selected based on the duration of the prediction window, predicting the field of view based on the head movement of the viewer and the machine learning algorithm, identifying a tile of the next chunk that corresponds to the field of view, and downloading the tile.

20 Claims, 4 Drawing Sheets

(51) Int. Cl.
*G06N 20/20* (2019.01)
*H04N 19/17* (2014.01)

(56) References Cited

U.S. PATENT DOCUMENTS

| | | | | |
|---|---|---|---|---|
| 5,875,108 | A * | 2/1999 | Hoffberg | G06F 3/00 |
| | | | | 700/17 |
| 5,956,028 | A * | 9/1999 | Matsui | G06F 3/1454 |
| | | | | 345/419 |
| 9,429,752 | B2 * | 8/2016 | Schowengerdt | G06F 3/011 |
| 9,858,706 | B2 * | 1/2018 | Pio | G06F 3/011 |
| 10,019,962 | B2 | 7/2018 | Liu et al. | |
| 10,026,224 | B2 | 7/2018 | Bell et al. | |
| 10,062,414 | B1 * | 8/2018 | Westphal | H04N 21/23406 |
| 10,096,130 | B2 * | 10/2018 | Pio | G06T 7/60 |
| 2006/0126730 | A1 * | 6/2006 | Arakawa | H04N 19/61 |
| | | | | 375/240.03 |
| 2006/0146143 | A1 * | 7/2006 | Xin | H04N 19/597 |
| | | | | 348/218.1 |
| 2011/0080948 | A1 * | 4/2011 | Chen | H04N 19/44 |
| | | | | 375/240.12 |
| 2011/0206288 | A1 * | 8/2011 | Lee | H04N 19/182 |
| | | | | 382/233 |
| 2014/0071235 | A1 * | 3/2014 | Zhang | H04N 19/70 |
| | | | | 348/43 |
| 2015/0256809 | A1 * | 9/2015 | Yie | H04N 13/161 |
| | | | | 375/240.16 |
| 2015/0350624 | A1 * | 12/2015 | Choi | H04N 13/178 |
| | | | | 348/43 |
| 2016/0012855 | A1 * | 1/2016 | Krishnan | G11B 27/105 |
| | | | | 386/241 |
| 2016/0198140 | A1 * | 7/2016 | Nadler | H04N 21/2343 |
| | | | | 348/43 |
| 2016/0328882 | A1 * | 11/2016 | Lee | H04N 13/366 |
| 2016/0352791 | A1 * | 12/2016 | Adams | H04N 21/8547 |
| 2017/0103577 | A1 | 4/2017 | Mendhekar et al. | |
| 2017/0193671 | A1 * | 7/2017 | Lee | G06K 9/00604 |
| 2017/0272729 | A1 * | 9/2017 | Kass | H04N 13/344 |
| 2018/0091577 | A1 | 3/2018 | Park et al. | |
| 2018/0096517 | A1 | 4/2018 | Mallinson | |
| 2018/0103199 | A1 | 4/2018 | Hendry et al. | |
| 2018/0108171 | A1 * | 4/2018 | Pio | G06T 15/20 |
| 2018/0146193 | A1 | 5/2018 | Safreed et al. | |
| 2018/0146198 | A1 | 5/2018 | Atluru et al. | |
| 2018/0146212 | A1 * | 5/2018 | Hensler | G06T 5/50 |
| 2018/0191857 | A1 | 7/2018 | Schooler et al. | |
| 2018/0324476 | A1 | 11/2018 | Zhu et al. | |
| 2019/0082183 | A1 * | 3/2019 | Shih | H04N 19/182 |
| 2019/0174125 | A1 * | 6/2019 | Ninan | G01S 3/00 |

* cited by examiner

ADAPTIVE FIELD OF VIEW PREDICTION

This application is a continuation of U.S. patent application Ser. No. 16/184,937, filed on Nov. 8, 2018, now U.S. Pat. No. 10,638,165, which is herein incorporated by reference in its entirety.

The present disclosure relates generally to video streaming, and relates more particularly to systems, non-transitory computer-readable media, and methods for adaptively predicting the field of view of a viewer who is streaming 360 degree video content.

BACKGROUND 360 degree streaming video (also known as immersive video or panoramic video) simultaneously records 360 degrees of a scene (e.g., using omnidirectional cameras or camera array systems) and then "wraps" the recorded video content onto a three-dimensional sphere, with a viewer at the center of the sphere. When viewing a 360 degree video, the viewer may freely control his or her viewing direction, so that each playback creates a unique viewing experience. As such, the viewer is provided with a unique, immersive viewing experience.

For instance, the display device used to display the 360 degree video (e.g., a head mounted display, or HMD) may track its orientation (e.g., pitch, yaw, and roll), and then compute and display an appropriate viewing area based on the device orientation and the field of view (i.e., the extent of the observable area that can be displayed by the device, which is typically fixed).

SUMMARY

The present disclosure describes a device, computer-readable medium, and method for adaptively predicting the field of view of a viewer who is streaming 360 degree video content. In one example, a method for streaming a 360 degree video over a communications network, wherein the video is streamed in a plurality of chunks, includes selecting a prediction window during which to predict a field of view within the video, wherein the field of view is expected to be visible by a viewer at a time of playback of a next chunk of the video, and wherein a duration of the prediction window is based on at least one condition within the communications network, selecting a machine learning algorithm to predict the field of view based on a head movement of the viewer, wherein the machine learning algorithm is selected based on the duration of the prediction window, predicting the field of view based on the head movement of the viewer and the machine learning algorithm, identifying a tile of the next chunk that corresponds to the field of view, and downloading the tile.

In another example, a wearable display device includes a processor configured to stream a 360 degree video over a communications network, and wherein the 360 degree video is streamed in a plurality of chunks and a computer-readable medium storing instructions which, when executed by the processor, cause the processor to perform operations. The operations include selecting a prediction window during which to predict a field of view within the 360 degree video, wherein the field of view is expected to be visible by a viewer at a time of playback of a next chunk of the plurality of chunks, and wherein a duration of the prediction window is based on at least one condition within the communications network, selecting a machine learning algorithm to predict the field of view based on a head movement of the viewer, wherein the machine learning algorithm is selected based on the duration of the prediction window, predicting the field of view based on the head movement of the viewer and the machine learning algorithm, identifying a tile of the next chunk that corresponds to the field of view, and downloading the tile.

In another example, a non-transitory computer-readable storage medium stores instructions which, when executed by a processor, cause the processor to perform operations for streaming a 360 degree video over a communications network, wherein the 360 degree video is streamed in a plurality of chunks. The operations include selecting a prediction window during which to predict a field of view within the 360 degree video, wherein the field of view is expected to be visible by a viewer at a time of playback of a next chunk of the plurality of chunks, and wherein a duration of the prediction window is based on at least one condition within the communications network, selecting a machine learning algorithm to predict the field of view based on a head movement of the viewer, wherein the machine learning algorithm is selected based on the duration of the prediction window, predicting the field of view based on the head movement of the viewer and the machine learning algorithm, identifying a tile of the next chunk that corresponds to the field of view, and downloading the tile.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
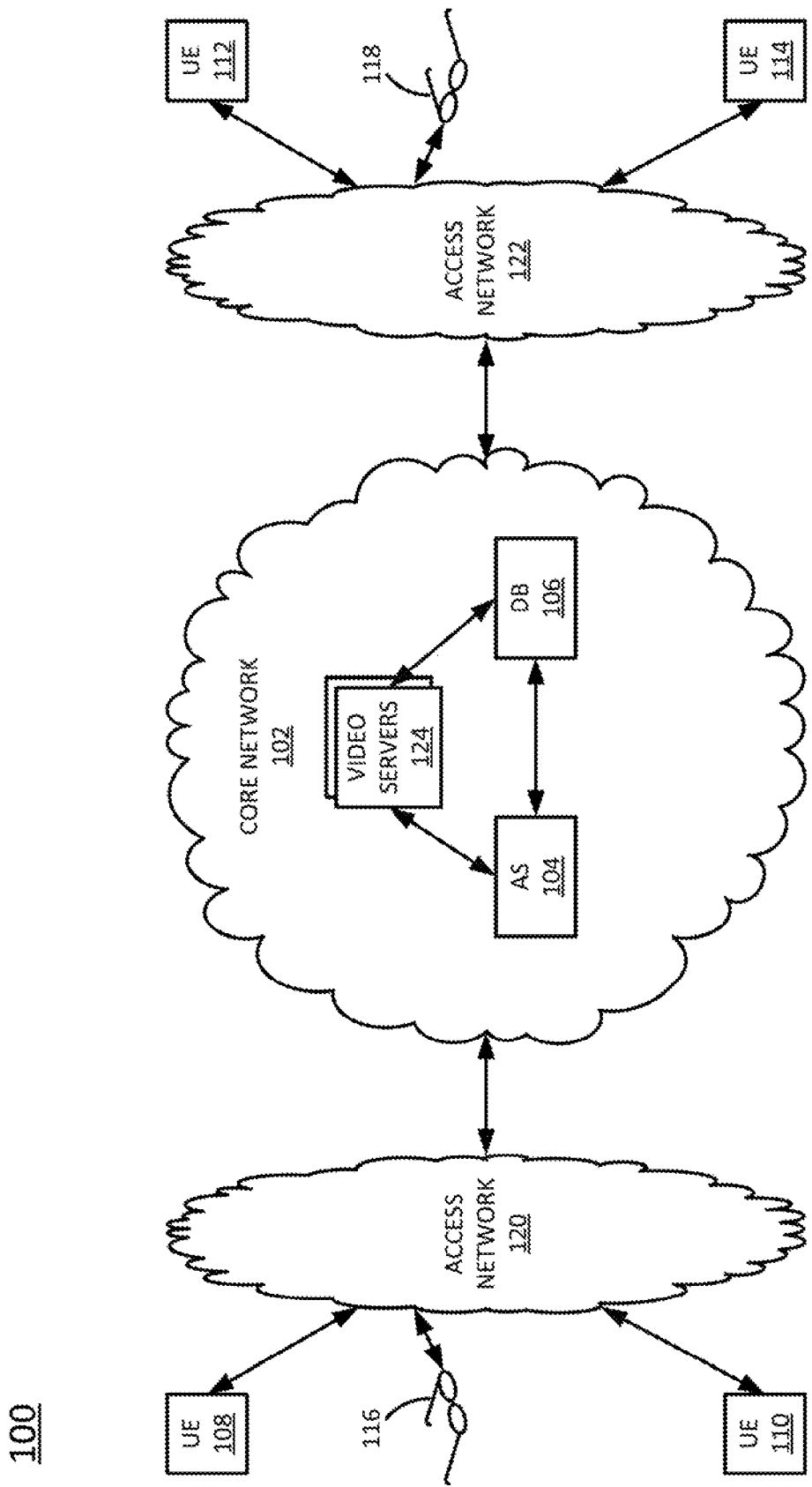
FIG. 1 illustrates an example network related to the present disclosure.

In one example, the present disclosure provides systems, non-transitory computer-readable media, and methods for adaptively predicting the field of view of a viewer who is streaming 360 degree video content. As discussed above, 360 degree streaming video applications compute and display an appropriate viewing area to display to a viewer based on the orientation of the display device and the field of view (i.e., the extent of the observable area that can be displayed by the display device, which is typically fixed). The use of 360 degree video has become widespread in a variety of applications, including video streaming applications, virtual reality (VR) applications, and augmented reality (AR) applications. However, despite the growing popularity of 360 degree videos, there remains a lack of understanding of many critical aspects of 360 degree video delivery, such as performance and resource consumption. For example, some display devices may fetch the entire 360 degree video (i.e., including portions both inside and outside the current field of view), which can create a burden on the network resources. This burden is even more pronounced in cellular networks, where bandwidth may be limited, links may be metered, throughput may fluctuate, and device radio energy consumption may be high.

Examples of the present disclosure operate within the context of a tile-based 360 degree video streaming technique. Tile-based streaming techniques segment a video chunk (i.e., a sequence of video and/or audio frames for a time block of a video) into a plurality of "tiles." The tiles are created prior to streaming the video. A tile corresponding to a video chunk will have the same duration as the chunk, but will contain only a portion of the chunk's visual data. Thus, in the case of a 360 degree video chunk, a tile will contain less than 360 degrees of visual data for the time block contained in the chunk. As an example, a video chunk containing projected raw frames may be evenly divided into a plurality of m×n rectangles, where each m×n rectangle comprises one tile. Metadata for each tile (such as position, uniform resource locator, or the like) may then be embedded in a metafile exchanged at the beginning of a video session.

During a video session, the display device may then request only those tiles for a video chunk that overlap with the projected visible area of the video chunk at a given time (rather than the entire 360 degree video). Multiple tiles can be requested in a single bundle, e.g., to reduce network roundtrips. This reduces the latency that the viewer may experience when the field of view changes, providing for a more seamless viewing experience. To err on the side of caution, the predicted field of view can be slightly increased, resulting in the request of additional tiles that may, in reality, fall outside the visible area. Thus, some bandwidth may be sacrificed in order to maintain the quality of the viewer experience. The number of additional tiles requested may be determined based on the recent prediction error maintained by the display device (e.g., the larger the error, the greater the number of additional tiles requested).

Examples of the present disclosure further optimize the viewer experience by using an adaptive machine learning technique to predict the viewer's future field of view with respect to a streaming 360 degree video. The machine learning technique is adaptive in the sense that the best machine learning algorithm for a given prediction window, which may be based on a current set of network conditions, may be chosen on-the-fly from among a plurality of available machine learning algorithms. The tile(s) that correspond to the predicted field of view can then be downloaded as discussed above. As different machine learning algorithms will perform differently for different prediction windows and under different network conditions, the disclosed technique is therefore highly responsive to changing circumstances during video streaming sessions.

To better understand the present disclosure, FIG. 1 illustrates an example network 100 related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, 5G, and the like) related to the current disclosure. It should be noted that an IP network is broadly defined as a network that uses Internet Protocol to exchange data packets. Additional illustrative IP networks include Voice over IP (VoIP) networks, Service over IP (SoIP) networks, and the like.

In one embodiment, the network 100 may comprise a core network 102. In one example, the core network 102 may combine core network components of a cellular network with components of a triple play service network; where triple play services include telephone services, Internet or data services, and television services to subscribers. For example, core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. The core network 102 may also further comprise an Internet Service Provider (ISP) network. In one embodiment, the core network 102 may include an application server (AS) 104, one or more video servers 124, and a database 106. Although a single AS 104 and a single DB 106 are illustrated, it should be noted that any number of application servers and databases may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (UEs) 108 and 110, while the access network 122 may be in communication with one or more UEs 112 and 114. In one embodiment, the UEs 108, 110, 112, and 114 may be any type of subscriber/customer endpoint device configured for wired and/or wireless communication such as a desktop computer, a laptop computer, a Wi-Fi device, a Personal Digital Assistant (PDA), a mobile phone, a smartphone, an email device, a computing tablet, a messaging device, a wearable "smart" device (e.g., a smart watch, smart glasses, or fitness tracker), a portable media device (e.g., an MP3 player), a gaming console, a portable gaming device, a set top box (STB), and the like. In one example, any one or more of the UEs 108, 110, 112, and 114 may have both cellular and non-cellular access capabilities and may further have wired communication and networking capabilities. It should be noted that although only four UEs are illustrated in FIG. 1, any number of user endpoint devices may be deployed.

In addition, the access network 120 may be in communication with one or more wearable display devices 116, while the access network 122 may be in communication with one or more wearable display devices 118. The wearable display devices 116 and 118 may comprise, for example, head mounted displays (HMDs), optical HMDs (OHMDs), smart glasses, or the like. In one example, the wearable display devices 116 and 118 may be configured for wireless communication. In one example, any one or more of the wearable display devices 116 and 118 may have both cellular and non-cellular access capabilities and may further have wired communication and networking capabilities. It should be noted that although two wearable display devices are illustrated in FIG. 1, any number of wearable display devices may be deployed.

In one example, the wearable display devices 116 and 118 may have installed thereon an application that can communicate, over the access networks 120 and/or 122 and the core network 102, with the AS 104, video server(s) 124, and/or DB 106. The application may perform all or part of the methods discussed below related to predicting the future field of view of a viewer who is streaming 360 degree video content. For instance, the application may collect data about a viewer's head movements and send the data to the AS 104 for assistance in predicting the viewer's future field of view. The application may also download tiles corresponding to chunks of a 360 degree video from the video server(s) 124.

Figure 4:
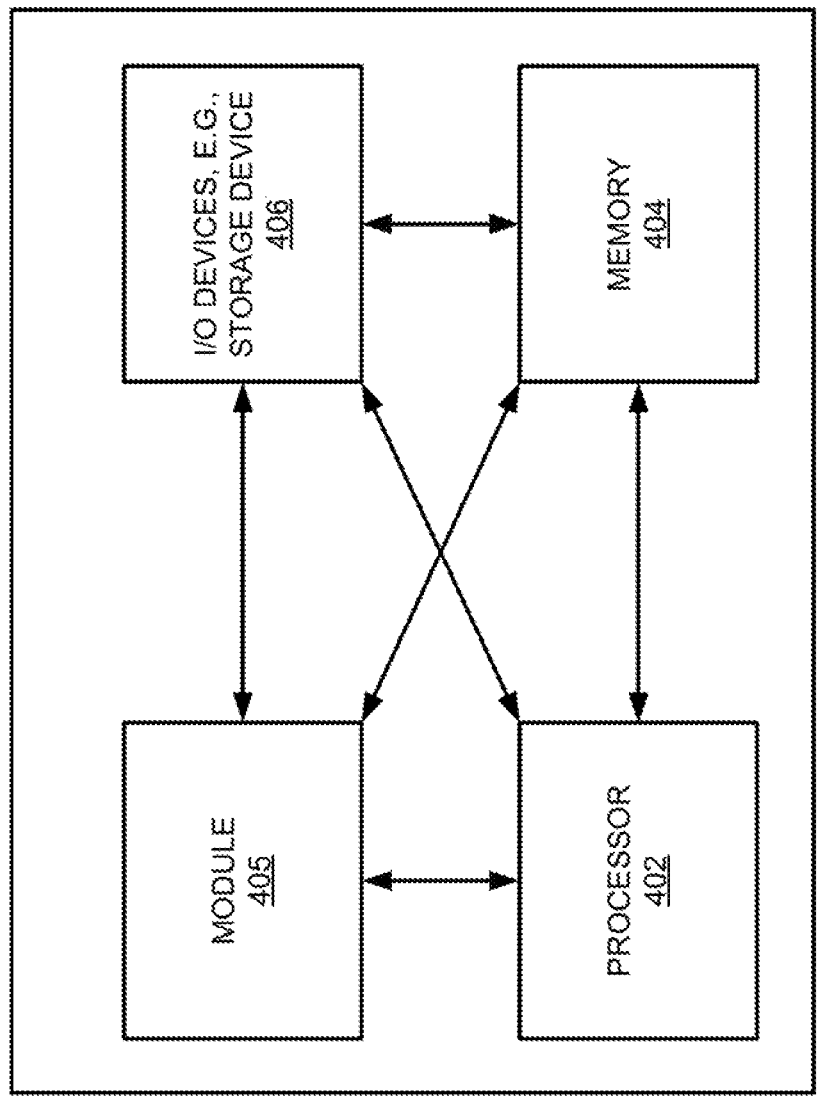
FIG. 4 depicts a high-level block diagram of a computing device specifically programmed to perform the functions described herein.

The AS 104 may comprise a computer programmed to operate as a special purpose computer, as illustrated in FIG. 4 and discussed below. In one example, the AS 104 may perform the methods discussed below related to predicting the future field of view of a viewer who is streaming 360 degree video content. For instance, in one example, the AS 104 hosts an application that monitors network conditions and determines appropriate prediction windows based on the network conditions at a given time. The application may further identify a best performing machine learning algorithm to use for predicting the future field of view within the appropriate prediction window. The application may also analyze the viewer's recent head movements to predict the viewer's head movements at some point in the imminent future (e.g., an expected time of playback for a next chunk of the video content). Data about the viewer's recent head movements may be provided by a wearable display device similar to wearable display devices 116 and 118. The application may further map the viewer's predicted head movements to a field of view of the wearable display device, and may further map the field of view to one or more tiles of a 360 degree video that is being streamed by the wearable display device.

In some examples, the wearable display devices 116 and 118 may host the same application as the AS 104. In this case, the wearable display devices 116 and 118 and the AS 104 may cooperate to perform different operations of the application. For instance, if the processing resources of the wearable display devices 116 or 118 are limited, the most processing intensive operations may be delegated to the AS 104. As an example, the AS 104 may monitor the network conditions and report the network conditions to the wearable display devices 116 and 118. The wearable display devices 116 and 118 may then perform the field of view predictions and tile selections based on the reported network conditions.

In one example, the DB 106 may store metadata for 360 degree videos stored by the video server(s) 124. For instance, the DB 106 may store for metadata (such as position, uniform resource locator, or the like) for each tile of a 360 degree video. The DB may also store one or more lookup tables. These lookup tables may define appropriate prediction windows for various network conditions, or may define the best performing machine learning algorithms for predicting field of view within prediction windows of various durations, as discussed below.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

The network 100 has been simplified. For example, the network 100 may include other network elements (not shown) such as border elements, routers, switches, policy servers, security devices, a content distribution network (CDN) and the like. The network 100 may also be expanded by including additional wearable display devices, endpoint devices, access networks, network elements, application servers, etc. without altering the scope of the present disclosure.

Figure 2:
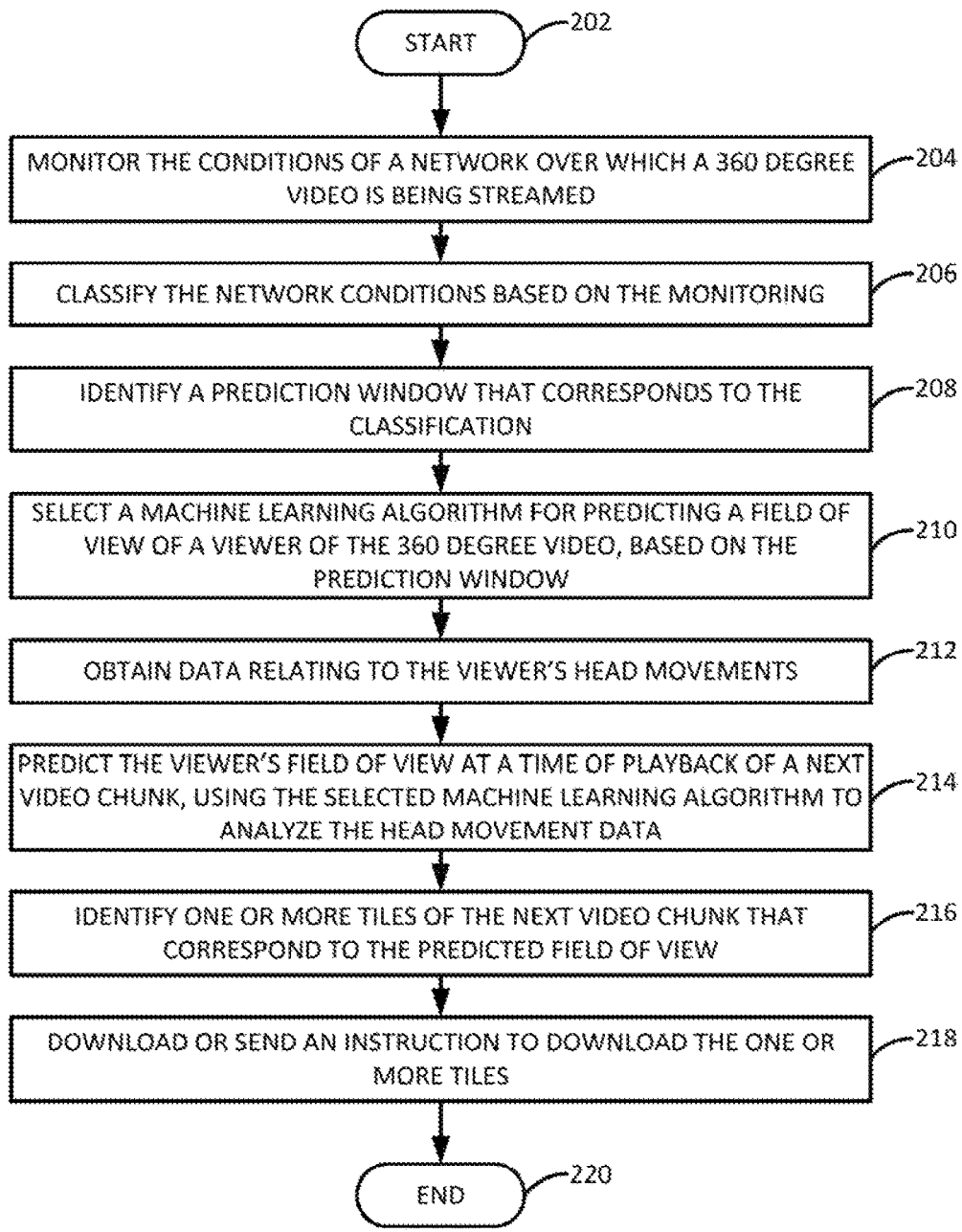
FIG. 2 illustrates a flowchart of an example method predicting the field of view of a viewer who is streaming 360 degree video content.

FIG. 2 illustrates a flowchart of an example method 200 for predicting the field of view of a viewer who is streaming 360 degree video content. In one example, the method 200 may be used to predict field of view when network conditions are stable (e.g., the measured latency does not vary with higher than a threshold standard deviation, where the threshold standard deviation may be, for instance, thirty milliseconds). The steps, functions, or operations of the method 200 may be performed, for example, by the AS 104 and/or one or the wearable display devices 116 or 118 illustrated in FIG. 1. For instance, if a wearable display device has a sufficiently powerful processor, the wearable display device may perform all steps of the method 200. Alternatively, to conserve processing power, the wearable display device may offload some of the more processing intensive steps of the method 200 to a remote application server.

In another example, the steps, functions, or operations of method 200 may be performed by a computing device or system 400, and/or processor 402 as described in connection with FIG. 4 below. Similarly, in one example, the steps, functions, and/or operations of the method 200 may be performed by a processing system comprising one or more computing devices collectively configured to perform various steps, functions, and/or operations of the method 200. For instance, multiple instances of the computing device or processing system 400 may collectively function as a processing system. For illustrative purposes, the method 200 is described in greater detail below in connection with an example performed by a processor, such as processor 402.

The method 200 begins in step 202. In step 204, the processor may monitor the conditions of the network over which the 360 degree video is being streamed. In one example, the network conditions that are monitored include latency and throughput.

In step 206, the processor may classify the current network conditions, based on the monitoring. In one example, the current network conditions may be classified as "poor,"

"fair," or "good," although other classifications may also be used. It should be noted that the classifications of "poor," "fair," or "good," network conditions are defined relative to each other. For instance, the network conditions could be assigned a numerical score that falls within some limited range (e.g., a scale of one to ten). As one example, where the classifications are "poor," "fair," and "good," the current conditions may be classified as "poor" if the measured latency is more than ninety milliseconds; "fair" if the measured latency is between thirty and ninety milliseconds; and "good" if the measured latency is less than thirty milliseconds.

In step 208, the processor may identify a prediction window that corresponds to the classification of the current network conditions. Within the context of the present disclosure, a "prediction window" defines a period of time, prior to the playback time (T) of the to-be-fetched tiles, during which the processor may fetch the tiles. Ideally, the length of the prediction window should provide the processor sufficient time to fetch the tiles before the tiles are needed for playback. It is during this "prediction window" that the processor may predict the viewer's field of view at the expected playback time T of the next video chunk, identify the tiles of the next video chunk that correspond to the predicted field of view, and fetch the identified tiles.

In one example, predefined or preassigned prediction windows may be assigned (e.g., in a lookup table) to various network condition classifications. Continuing the example above, "good" network conditions may be assigned a short prediction window (e.g., 0.2 seconds); "fair" network conditions may be assigned a medium prediction window (e.g., 0.5 seconds); and "poor" network conditions may be assigned a long prediction window (e.g., 1.0 seconds), where the durations of "short," "medium," and "long" prediction windows are defined relative to each other. Again, other predictions windows could be used. For instance, where network conditions may be classified numerically on a scale, a similar scale could be used to define the corresponding prediction windows, e.g., where the durations of the prediction windows are inversely proportional to the "goodness" of the network conditions, or, put another way, are proportional to the latency. In other words, the better the network conditions (e.g., the shorter the latency), the shorter the prediction window.

In step 210, the processor may select a machine learning algorithm to use to predict the field of view of the viewer at the playback time T, based on the prediction window identified in step 208. Different machine learning algorithms may perform differently depending on the duration of the prediction window. For instance, one machine learning algorithm may provide the best results when the prediction window is shorter than a threshold period of time, while another machine learning algorithm may provide the best results when the prediction window is longer than the threshold period of time. Which machine learning algorithms perform best for which prediction windows may be determined experimentally, e.g., offline. A goal of the present disclosure is to adaptively select the machine learning algorithm (from among a plurality of available machine learning algorithms) that will perform best for a current prediction window, where the duration of the current prediction window depends on the current network conditions.

In one example, machine learning algorithms may be pre-assigned (e.g., in a lookup table) to various prediction windows. For example, a short prediction window (e.g., of 0.2 seconds) may be assigned a first machine learning algorithm (e.g., linear regression); a medium prediction window (e.g., of 0.5 seconds) may be assigned a second machine learning algorithm (e.g., ridge regression); and a long prediction window (e.g., of 1.0 seconds) may be assigned a third machine learning algorithm (e.g., deep learning). Any number of machine learning algorithms may be available for selection. Some machine learning algorithms may be assigned to more than one prediction window. Moreover, some prediction windows may be assigned more than one machine learning algorithm.

In step 212, the processor may obtain data relating to the head movements of the viewer who is currently viewing the 360 degree video. The viewer may be viewing the 360 degree video using a wearable display device (e.g., an HMD, OMHD, smart glasses, or the like) that streams the 360 degree video from a video server, e.g., by continuously downloading and displaying tiles of the video. The wearable display device may track and record the user's head movements over a predefined period of time (e.g., x seconds) and send data relating to the head movements to the processor, if the processor is part of a remote application server. In this case, the data may be sent to the processor continuously, on-demand, or according to any other schedules. If the processor is part of the wearable display device, then the processor may simply obtain the data relating to the head movements from a local storage of the wearable display device.

In step 214, the processor may predict the field of view of the viewer at the playback time T, using the machine learning algorithm selected in step 210 to analyze the head movement data obtained in step 212. In one example, predicting the field of view occurs within the prediction window identified in step 208. For instance, if the prediction window is 0.2 seconds, then the processor may begin predicting the field of view at time T−0.2. Various methods can be used for predicting field of view based on viewer head movements (e.g., pitch, yaw, and roll). For instance, in one example, the OPENTRACK open-source head tracking program, or a similar program, may be employed in this context.

In step 216, the processor may identify one or more tiles of the next video chunk that correspond to the predicted field of view at playback time T (e.g., the tiles that are expected to be visible in the predicted field of view at playback time T). In one example, as discussed above, the processor may also identify one or more tiles that correspond to portions of the 360 degree video at playback time T that are not visible in the predicted field of view, to accommodate for possible error in the field of view prediction.

In step 218, the processor may download the tile(s) identified in step 216 (e.g., if the processor is part of the wearable display device), or the processor may send a message (e.g., if the processor is part of a remote application server) instructing the wearable display device to download the tile(s). The method 200 then ends in step 220.

The method 200 may be performed at any time during a 360 degree video streaming session. Moreover, the method 200 may be performed repeatedly or continuously during the 360 degree video streaming session, for instance every time a new chunk of the streaming video is to be downloaded.

In some examples, the network conditions may be unstable (e.g., the measured latency varies with higher than a threshold standard deviation, where the threshold standard deviation may be, for instance, thirty milliseconds). In such an instance, if the same prediction window is used to download the entire video, there is a risk that the download may not be completed. Thus, when network conditions are unstable, it may be useful to leverage multiple prediction opportunities, as discussed in connection with FIG. 3.

Figure 3:
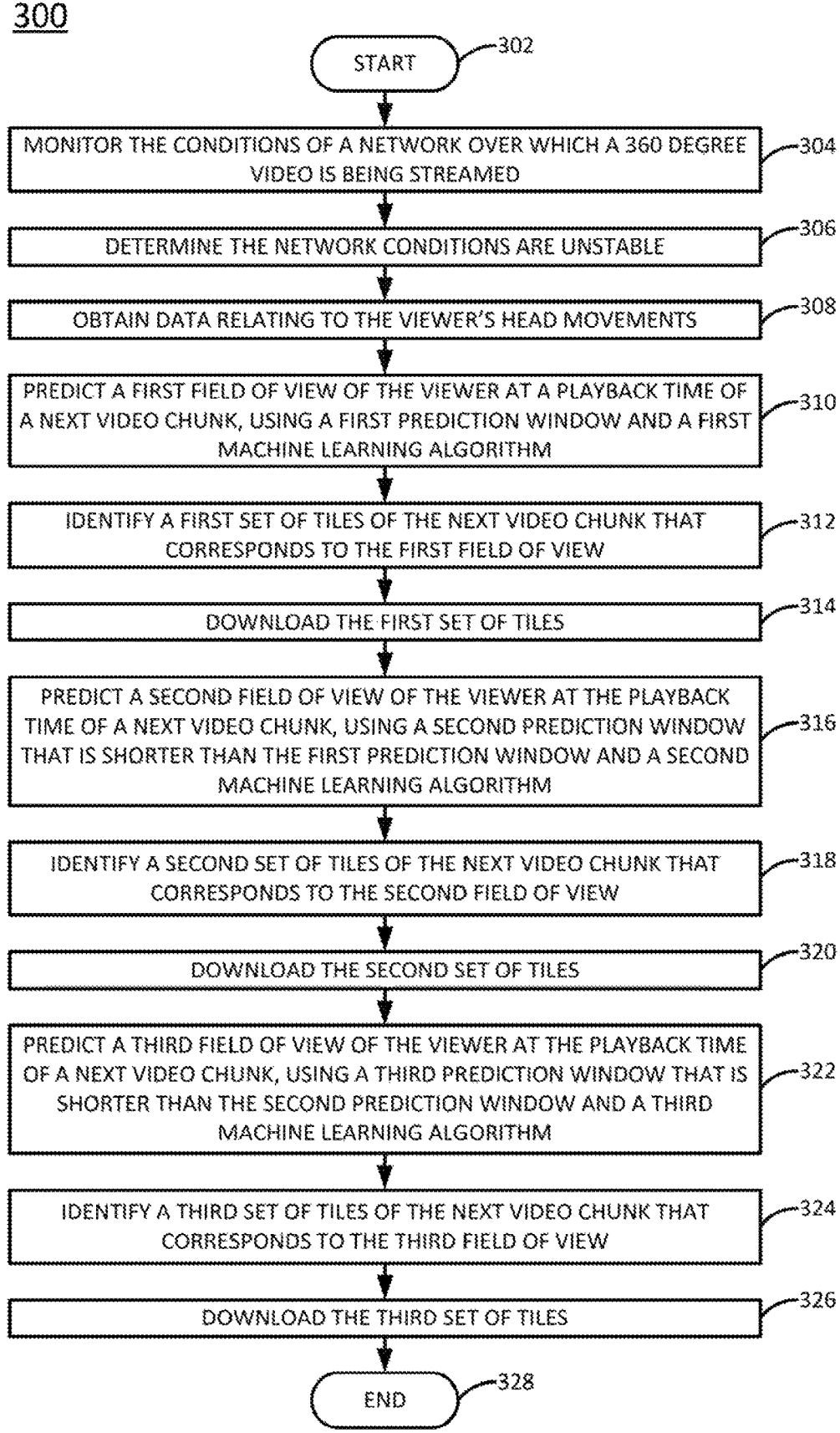
FIG. 3 illustrates a flowchart of an example method predicting the field of view of a viewer who is streaming 360 degree video content.

FIG. 3 illustrates a flowchart of an example method 300 for predicting the field of view of a viewer who is streaming 360 degree video content. In one example, the method 300 may be used to predict field of view when network conditions are unstable (e.g., the measured latency varies with higher than a threshold standard deviation, where the threshold standard deviation may be, for instance, thirty milliseconds). The steps, functions, or operations of the method 300 may be performed, for example, by the AS 104 and/or one or the wearable display devices 116 or 118 illustrated in FIG. 1. For instance, if a wearable display device has a sufficiently powerful processor, the wearable display device may perform all steps of the method 300. Alternatively, to conserve processing power, the wearable display device may offload some of the more processing intensive steps of the method 300 to a remote application server.

In another example, the steps, functions, or operations of method 300 may be performed by a computing device or system 400, and/or processor 402 as described in connection with FIG. 4 below. Similarly, in one example, the steps, functions, and/or operations of the method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processor, such as processor 302.

The method 300 begins in step 302. In step 304, the processor may monitor the conditions of the network over which the 360 degree video is being streamed. In one example, the network conditions that are monitored include latency and throughput.

In step 306, the processor may determine that the network conditions are unstable. For instance, the processor may observe that the measured latency varies higher than a threshold standard deviation. In one example, the threshold standard deviation may be thirty milliseconds.

In step 308, the processor may obtain data relating to the head movements of the viewer who is currently viewing the 360 degree video. As discussed above, the viewer may be viewing the 360 degree video using a wearable display device (e.g., an HMD, OMHD, smart glasses, or the like) that streams the 360 degree video from a video server, e.g., by continuously downloading and displaying tiles of the video. The wearable display device may track and record the user's head movements over a predefined period of time (e.g., x seconds) and send data relating to the head movements to the processor, if the processor is part of a remote application server. In this case, the data may be sent to the processor continuously, on-demand, or according to any other schedule. If the processor is part of the wearable display device, then the processor may simply obtain the data relating to the head movements from a local storage of the wearable display device.

In step 310, the processor may predict a first field of view of the viewer at the playback time T, using a first prediction window and a first machine learning algorithm corresponding to the first prediction window. In one example, the first prediction window may be the longest available prediction window (e.g., such that the prediction window starts at time T−1 second, continuing the example prediction windows above).

In step 312, the processor may identify a first set of tiles, where the first set of tiles comprises one or more tiles that correspond to a portion of the 360 degree video at playback time T that is visible in the first field of view. In one example, as discussed above, the processor may also identify one or more tiles that correspond to portions of the 360 degree video at playback time T that are not visible in the first field of view, to accommodate for possible error in the field of view prediction.

In step 314, the processor may download the first set of tiles (e.g., if the processor is part of the wearable display device), or the processor may send a message (e.g., if the processor is part of a remote application server) instructing the wearable display device to download the first set of tiles.

In step 316, the processor may predict a second field of view of the viewer at the playback time T, using a second prediction window and a second machine learning algorithm corresponding to the second prediction window. In one example, the second prediction window is shorter than the first prediction window and may have a duration that falls somewhere between the shortest and longest available prediction windows. For instance continuing the example above, if the first prediction window started at time T−1 second, the second prediction window might start at time T−0.5 seconds.

In step 318, the processor may identify a second set of tiles, where the second set of tiles comprises one or more tiles that correspond to a portion of the 360 degree video at playback time T that is visible in the second field of view. In one example, as discussed above, the processor may also identify one or more tiles that correspond to portions of the 360 degree video at playback time T that are not visible in the second field of view, to accommodate for possible error in the field of view prediction.

In step 320, the processor may download the second set of tiles (e.g., if the processor is part of the wearable display device), or the processor may send a message (e.g., if the processor is part of a remote application server) instructing the wearable display device to download the second set of tiles. A smaller prediction window has been experimentally shown to provide better accuracy in terms of predicted field of view. As such, in one example, if the second set of tiles is not exactly the same as the first set of tiles, the processor may, in step 320, download tiles that are in the second set of tiles but not the first set of tiles, in order to incrementally update the set of fetched tiles. In one example, the tiles that are in the second set of tiles may have a higher priority than tiles in the first set of tiles.

In step 322, the processor may predict a third field of view of the viewer at the playback time T, using a third prediction window and a third machine learning algorithm corresponding to the second third window. In one example, the third prediction window is shorter than the second prediction window and may be the shortest available prediction window. For instance continuing the example above, if the first prediction window started at time T−1 second, and the second prediction window started at time T−0.5 seconds, then the third prediction window might start at time T−0.2 seconds.

In step 324, the processor may identify a third set of tiles, where the third set of tiles comprises one or more tiles that correspond to a portion of the 360 degree video at playback time T that is visible in the third field of view. In one example, as discussed above, the processor may also identify one or more tiles that correspond to portions of the 360 degree video at playback time T that are not visible in the third field of view, to accommodate for possible error in the field of view prediction.

In step 326, the processor may download the third set of tiles (e.g., if the processor is part of the wearable display device), or the processor may send a message (e.g., if the processor is part of a remote application server) instructing the wearable display device to download the third set of tiles. In one example, if the third set of tiles is not exactly the same as the first set of tiles or the second set of tiles, the processor may, in step 326, download tiles that are in the third set of tiles but not the first set of tiles or the second set of tiles, in order to incrementally update the set of fetched tiles. In one example, the tiles that are in the third set of tiles may have a higher priority than tiles in the first set of tiles or the second set of tiles.

The method 300 may end in step 328.

The method 300 may be performed at any time during a 360 degree video streaming session. Moreover, the method 300 may be performed repeatedly or continuously during the 360 degree video streaming session, for instance every time a new chunk of the streaming video is to be downloaded.

Examples of the method 300 may experience a trade-off between the quality of the viewer experience and network efficiency. For instance, by initiating the prediction of the field of view at the start of the longer prediction window (e.g., at time T−1 second), the wearable display device may have more time to download the tiles that are expected to be in the field of view at the time of playback T. However, there is also a risk that the relatively long prediction window may result in prediction inaccuracies (and, consequently, the download of tiles outside the actual field of view at time of playback T). On the other hand, while a shorter prediction window (e.g., T−0.2 seconds) may result in a more accurate field of view prediction (and download of fewer superfluous tiles), there may be a greater chance of the wearable display device not having enough time to finish the download of the necessary tiles (and, consequently, experience a playback delay).

Although not expressly specified above, one or more steps of the methods 200 or 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device specifically programmed to perform the functions described herein. For example, any one or more components or devices illustrated in FIG. 1 or described in connection with the methods 200 or 300 may be implemented as the system 400. For instance, a wearable display device or an application server could be implemented as illustrated in FIG. 4.

As depicted in FIG. 4, the system 400 comprises a hardware processor element 402, a memory 404, a module 405 for predicting the field of view of a viewer who is streaming 360 degree video content, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for predicting the field of view of a viewer who is streaming 360 degree video content may include circuitry and/or logic for performing special purpose functions relating to streaming 360 degree video content. The input/output devices 406 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a sensor, an output port, or a user input device (such as a keyboard, a keypad, a mouse, and the like).

Although only one processor element is shown, it should be noted that the dedicated computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for predicting the field of view of a viewer who is streaming 360 degree video content (e.g., a software program comprising computer-executable instructions) can be loaded into memory 404 and executed by hardware processor element 402 to implement the steps, functions or operations as discussed above in connection with the example methods 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for predicting the field of view of a viewer who is streaming 360 degree video content (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a disclosed example should not be limited by any of the above-described examples, but should be defined only in accordance with the following claims and their equivalents.

What is claimed is:

1. A method for streaming a 360 degree video over a communications network, wherein the 360 degree video is streamed in a plurality of chunks, the method comprising:
    selecting, by a processor, a prediction window during which to predict a field of view within the 360 degree video, wherein the field of view is expected to be visible by a viewer at a time of playback of a next chunk of the plurality of chunks;
    selecting, by the processor, a machine learning algorithm to predict the field of view based on a head movement of the viewer, wherein the machine learning algorithm is further selected based on a duration of the prediction window;
    predicting, by the processor, the field of view based on the head movement of the viewer and the machine learning algorithm;
    identifying, by the processor, a tile of the next chunk that corresponds to the field of view; and
    downloading, by the processor, the tile.

2. The method of claim 1, wherein the prediction window defines a period of time prior to the time of playback of the next chunk.

3. The method of claim 1, further comprising:
    monitoring at least one condition within the communications network, wherein the at least one condition comprises a latency of the communications network.

4. The method of claim 3, wherein the duration of the prediction window is proportional to the latency.

5. The method of claim 3, wherein the duration of the prediction window is preassigned to the at least one condition in a lookup table.

6. The method of claim 1, wherein the machine learning algorithm is one of a plurality of machine learning algorithms available to use for predicting the field of view.

7. The method of claim 6, wherein the machine learning algorithm is preassigned to the duration of the prediction window in a lookup table.

8. The method of claim 6, wherein the machine learning algorithm is observed to perform best among the plurality of machine learning algorithms for the duration of the prediction window.

9. The method of claim 1, wherein the method is performed every time a new chunk of the plurality of chunks is to be downloaded.

10. The method of claim 1, wherein the method is performed by a wearable display device worn by the viewer, and wherein the wearable display device displays at least a portion of the 360 degree video to the viewer.

11. A wearable display device comprising:
    a processor configured to stream a 360 degree video over a communications network, wherein the 360 degree video is streamed in a plurality of chunks; and
    a computer-readable medium storing instructions which, when executed by the processor, cause the processor to perform operations, the operations comprising:
        selecting a prediction window during which to predict a field of view within the 360 degree video, wherein the field of view is expected to be visible by a viewer at a time of playback of a next chunk of the plurality of chunks;
        selecting a machine learning algorithm to predict the field of view based on a head movement of the viewer, wherein the machine learning algorithm is further selected based on a duration of the prediction window;
        predicting the field of view based on the head movement of the viewer and the machine learning algorithm;
        identifying a tile of the next chunk that corresponds to the field of view; and
        downloading the tile.

12. The wearable display device of claim 11, wherein the prediction window defines a period of time prior to the time of playback of the next chunk.

13. The wearable display device of claim 11, the operations further comprising:
    monitoring at least one condition within the communications network, the at least one condition comprises a latency of the communications network.

14. The wearable display device of claim 13, wherein the duration of the prediction window is proportional to the latency.

15. The wearable display device of claim 13, wherein the duration of the prediction window is preassigned to the at least one condition in a lookup table.

16. The wearable display device of claim 11, wherein the machine learning algorithm is one of a plurality of machine learning algorithms available to use for predicting the field of view.

17. The wearable display device of claim 16, wherein the machine learning algorithm is preassigned to the duration of the prediction window in a lookup table.

18. The wearable display device of claim 16, wherein the machine learning algorithm is observed to perform best among the plurality of machine learning algorithms for the duration of the prediction window.

19. The wearable display device of claim 11, wherein the operations are performed every time a new chunk of the plurality of chunks is to be downloaded.

20. A non-transitory computer-readable storage medium storing instructions which, when executed by a processor, cause the processor to perform operations for streaming a 360 degree video over a communications network, wherein the 360 degree video is streamed in a plurality of chunks, the operations comprising:
    selecting a prediction window during which to predict a field of view within the 360 degree video, wherein the field of view is expected to be visible by a viewer at a time of playback of a next chunk of the plurality of chunks;
    selecting a machine learning algorithm to predict the field of view based on a head movement of the viewer, wherein the machine learning algorithm is further selected based on a duration of the prediction window;

predicting the field of view based on the head movement of the viewer and the machine learning algorithm;
identifying a tile of the next chunk that corresponds to the field of view; and
downloading the tile.

* * * * *